Patented Oct. 30, 1923.

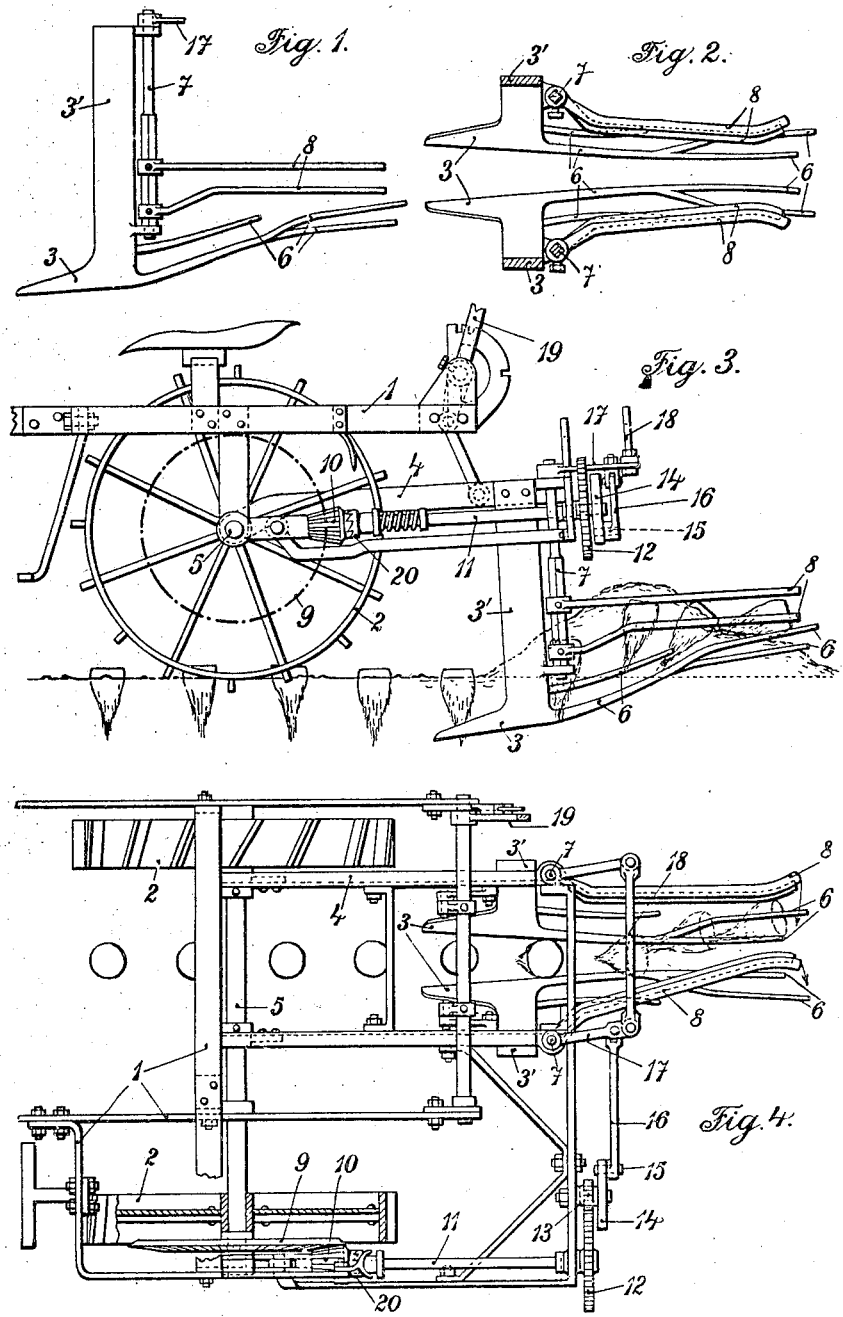

1,472,328

UNITED STATES PATENT OFFICE.

VÁCLAV OTAKAR DEYL, OF VINOR, BOHEMIA.

TURNIP-GATHERING DEVICE.

Application filed August 22, 1921. Serial No. 494,133.

*To all whom it may concern:*

Be it known that I, Václav Otakar Deyl, a citizen of the Czechoslovakian Republic, residing at Vinor, Bohemia, have invented certain new and useful Improvements in Turnip-Gathering Devices, of which the following is a specification.

My invention relates to devices for digging up turnips and the like. In such devices as at present constructed it happens that a good many of the turnips dug up remain covered by the soil thrown up by the machine and are thus lost.

It is an object of my invention to provide a device by means of which the lifted turnips prior to leaving the machine are subjected to a shaking motion during which the turnip remains in the machine and by which the soil is shaken off sideways, so that the turnip freed of the soil is finally deposited on the ground.

In the drawings affixed to this specification and forming part thereof, a device is illustrated embodying my invention by way of example. In the drawings—

Fig. 1 is a side-elevation and

Fig. 2 a plan while

Figs. 3 and 4 are similar views of a turnip lifter with the shaking device according to the invention, applied to it.

The turnip lifter essentially consists of the frame 1 supported upon two front steering wheels and two back driving wheels. When the turnip lifter is not driven by a motor, one of the back wheels operates the shaking device according to this invention, which together with the usual lifting plowshares 3 is mounted upon the frame 4 adapted to swing vertically around the axle 5 of back wheels.

The shaking device has the form of a basket or skeleton trough, the lower portion of which forms a stationary guide in the shape of a fork 6 with a plurality of prongs, which fork forms a continuation of the shares 3 in such a manner, that the turnip the top of which has been sliced off and which has been lifted out of the ground is pushed by the pressure of the soil on to and along the fork.

The upright extensions 3' of both shares 3 support in their rear in suitable bearings the vertical shafts 7, upon which several pairs of arms 8 are mounted which are adapted to move simultaneously to the right and to the left.

The arms 8 are vertically adjustable upon the shafts 7 and suitably bent so as to slightly converge in the rear to stop or delay the turnip passing through the basket. The swinging movement of the arms 8 is effected by imparting angular motion to the vertical shafts 7 by means of suitable lever arms through the agency of some appropriate driving mechanism, such as a crank with accessories.

In the construction illustrated the left back wheel 2 drives through bevel-wheels 9, 10 and the shaft 11 the pair of spur wheels 12, 13. With the pinion 13 of this pair of wheels is connected a crank disc 14 with a radially adjustable crank pin 15, engaged by one end of a connecting rod 16, the other end of which is hinged to a lever 17, keyed to the vertical shaft 7 upon which the arms 8 are mounted. The other shaft 7 with its arms is operated by the connecting rod 18.

This machine operates in the following manner: The shares 3 dig and lift up the turnips together with the adhering soil and the soil in front forces the turnip up and along the guides 6 into the shaking device in which they are detained for a time owing to the swinging motion of the arms, being thrown from one side of the basket to the other whereby the larger portion of the soil adhering to them drops off and the turnips are thus cleaned and finally discharged from the machine when they drop to the ground where they can easily be picked up by hand. The turnips may, however, equally well be discharged into a suitable receptacle.

When the digging and lifting work has been finished, the frame 4 with the shares 3 and the shaking device may be raised by means of a hand-lever 19, whereby the clutch 20 for the drive is automatically thrown out of gear.

I claim:

1. In a device of the kind described in combination, means for lifting a turnip from the ground and for guiding it towards the rear, a vertical shaft near said guiding means, means for rocking said shaft and an arm on said shaft extending substantially in parallel with said guiding means.

2. In a device of the kind described in combination, means for lifting a turnip from the ground and for guiding it towards the rear, a vertical shaft on each side of said guiding means, means for rocking said shafts and slightly converging arms on said shafts extending substantially in parallel with said guiding means.

3. In a device of the kind described in combination, means for lifting a turnip from the ground and for guiding it towards the rear, a vertical shaft on each side of said guiding means, means for rocking said shafts and slightly converging arms displaceably arranged on said shafts and extending substantially in parallel with said guiding means.

In testimony whereof I affix my signature.

VÁCLAV OTAKAR DEYL.

Witnesses:
 MILOSLAV HRUBÝ,
 JOSEF NOVÁY.